(12) United States Patent
Najork et al.

(10) Patent No.: US 6,594,694 B1
(45) Date of Patent: Jul. 15, 2003

(54) SYSTEM AND METHOD FOR NEAR-UNIFORM SAMPLING OF WEB PAGE ADDRESSES

(75) Inventors: Marc Alexander Najork, Palo Alto, CA (US); Clark Allan Heydon, San Francisco, CA (US); Michael Mitzenmacher, Belmont, MA (US); Monika H. Henzinger, Menlo Park, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/570,418

(22) Filed: May 12, 2000

(51) Int. Cl.$^7$ ................................................ G06F 15/16
(52) U.S. Cl. ...................... 709/219; 709/203; 709/217; 709/245; 709/227
(58) Field of Search ................................ 709/201–203, 709/217, 219, 227, 245

(56) References Cited

U.S. PATENT DOCUMENTS

| | | | | |
|---|---|---|---|---|
| 5,150,464 A | * | 9/1992 | Sidhu et al. ................. | 709/222 |
| 6,263,364 B1 | * | 7/2001 | Najork et al. ................ | 709/217 |
| 6,401,118 B1 | * | 6/2002 | Thomas ....................... | 709/224 |
| 6,487,555 B1 | * | 11/2002 | Bharat et al. .................. | 707/10 |
| 6,516,337 B1 | * | 2/2003 | Tripp et al. .................. | 709/202 |

OTHER PUBLICATIONS

K. Bharat and A. Broder. A Technique for Measuring the Relative Size and Overlap of Public Web Search Engines. In Proceedings of the 7th International World Wide Web Conference, Brisbane, Australia, pp. 379–388. Elsevier Science, Apr. 1998.

Monika R. Henzinger, Allan Heydon, Michael Mitzenmacher, and Marc Najork. Measuring Index Quality using Random Walks on the Web. In Proceedings of the 8th International World Wide Web Conference, Toronto, Canada, pp. 213–225, May, 1999.

S. Brin and L. Page. The Anatomy of a Large–Scale Hypertextual Web Search Engine. In Proceedings of the 7th International World Wide Web Conference, Brisbane, Australia, pp. 107–117. Elsevier Science, Apr. 1998.

"The PageRank Citation Ranking: Bringing Order to the Web"; Lawrence Page, Sergey Brin, Rajeev Motwani and Terry Winograd; Stanford Digital Library Technologies SIDL–WP–1999–0120; paper created on Jan. 29, 1998; pps 1–17.

\* cited by examiner

*Primary Examiner*—David Wiley
*Assistant Examiner*—Joseph E. Avellino

(57) ABSTRACT

A system generates a list of near-uniform samples of data sets (e.g., web pages) from among a plurality of host computers. The system performs a random walk so as to generate a set of visited addresses. For each address in the set, a reachability measure is computed. Then, samples are selected from the set, such that the probability of selecting a given address is inversely proportional to the reachability measure for the address. The selected samples form the list of near-uniform samples.

36 Claims, 7 Drawing Sheets

170-A

For each page "u" visited during the random walk, compute reachability measure M(u):

$$M(u) = \frac{\text{Number of time "u" was visited during the random walk}}{\text{Total number of pages visited during the random walk}}$$

SYSTEM AND METHOD FOR NEAR-UNIFORM SAMPLING OF WEB PAGE ADDRESSES

FIELD OF THE INVENTION

The present invention relates to a system and method for sampling web page addresses by performing a random walk, so that a near-uniform sample is obtained.

BACKGROUND OF THE INVENTION

Documents on interconnected computer networks are typically stored on numerous host computers that are connected over the networks. For example, so-called "web pages" may be stored on the global computer network known as the Internet, which includes the world wide web. Web pages can also be stored on Intranets, which are typically private networks maintained by corporations, government entities, and other groups. Each web page, whether on the world wide web or an Intranet, has a distinct address called its uniform resource locator (URL), which at least in part identifies the location or host computer of the web page. Many of the documents on Intranets and the world wide web are written in standard document description languages (e.g., HTML, XML). Theses languages allow an author of a document to create hypertext links to other documents. Hypertext links allow a reader of a web page to quickly move to another web page by clicking on the links. These links are typically highlighted in the original web page. A web page containing hypertext links to other web pages generally refers to those pages by their URL's. Links in a web page may refer to web pages that are stored in the same or different host computers.

It is often desirable to obtain statistical information about web pages on the world wide web, including information about the characteristics of the URL's of the web pages as well as information about the characteristics of the documents referred to by the URL's. Examples of characteristics of the URL's for which statistical information may be gathered include length of the URL's, number of arcs in the URL's, port numbers, file name extensions, and top level Internet domains. Examples of characteristics of the documents for which statistical information may be gathered include length, character set used, language, number of outbound links, number of embedded images, and percentage that are directed to a particular interest (e.g., political, sports, business) or activity (e.g., e-commerce).

Referring to FIG. 1A, a list containing a randomly selected set of URL's may be obtained by performing a random walk of the web (i.e., the world wide web, or the web on an Intranet). Starting with a seed set of URL's, the random walk engine downloads a URL selected at random from the seed set. Any outgoing links are extracted from the downloaded URL. The random walk engine selects an outgoing link, if any, at random to become the current URL. If there is no outgoing link in the downloaded URL, a seed is chosen at random from the seed set. Each downloaded page not in the seed set is added to the seed set. The list of randomly selected URL's may be formed by selecting the URL's of the visited pages, or the URL's of visited pages plus all URL's referenced by the visited pages, or by randomly selecting a subset of the pages from either of the aforementioned sets of URL's.

Referring to FIG. 1B, another way to obtain a random sample of URL's is to randomly select one or more search terms from a lexicon, perform a search engine query using the selected search terms, and then randomly select one or more URL's from the search results. The selected URL or URL's are added to the list of randomly selected URL's. This process may then be repeated until a suitably sized list of randomly selected URL's has been formed.

While the random sampling procedures described above result in a list of random URL's, the list is biased toward well connected URL's. Referring to FIG. 2, there is shown a small portion of a hypothetical set 50 of interlinked pages 51–65. As can be seen, some pages have only one inbound link, while others have much larger numbers of inbound links. The URL for a page that is referred to by many pages is more likely to be visited during a random walk, and also more likely to be indexed by a search engine than a URL that is referred to by few pages. Therefore the list generated by the aforementioned procedures is not uniformly representative of the URL's (or pages) in the set of reachable pages.

SUMMARY OF THE INVENTION

The present invention is a system and method for generating a list of near-uniform samples of data sets (e.g., web pages) from among a plurality of host computers. The system performs a random walk so as to generate a set of visited addresses, sometimes called a set of randomly selected addresses, wherein each address in the set corresponds to a data set. For each address in the set of visited addresses, a reachability measure is computed. Then, samples are selected from the set of visited addresses, such that the probability of selecting a given address is inversely proportional to the reachability measure for the address. The selected samples form the list of near-uniform samples.

In an exemplary embodiment, the set of visited addresses is generated by selecting a current address uniformly at random from a seed set, downloading a data set using the current address, and adding the current address along with the outbound links in the corresponding data set to the set of visited addresses. If the data set contains no outbound links, another address is selected uniformly at random from the seed set to become the new current address. Otherwise, a new current address is selected by computing a uniformly random real value r. When r is less than a predetermined value D, an address is selected uniformly at random from the seed set to become the new address, and otherwise an address is selected uniformly at random from the outbound links of the downloaded data set to become the new current address.

In an exemplary embodiment, the reachability measure for each respective address may be set equal to a visited ratio, comprising a ratio of the number of visits to the respective address to the total number of pages visited during the random walk of the data sets. Alternately, the reachability measure for each respective address may be set equal to the page rank of the data set at the address, where the page rank is an estimate, computed using a predefined page rank function, of what fraction of visits in an infinitely long random walk of reachable data sets at the plurality of hosts would be to the data set at the respective address.

In an exemplary embodiment, the sampling of addresses in the set of visited addresses is accomplished by computing a cumulative probability density function using the reachability measure, and then, for each sample to be included in the list of near-uniform samples by selecting a random value of the cumulative probability density function, and adding to the list the address (from the set of visited addresses) that corresponds to the random value of the cumulative probability density function.

DETAILED DESCRIPTION OF EXEMPLARY EMBODIMENTS

Figure 1A:
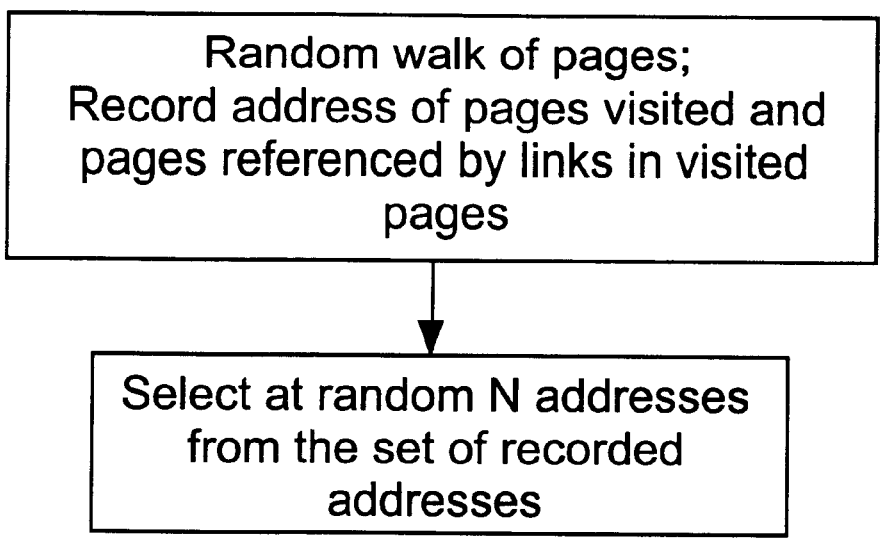
FIGS. 1A and 1B are flow charts of prior art methods for generating a non-uniform random sample of data set addresses.
Figure 1B:
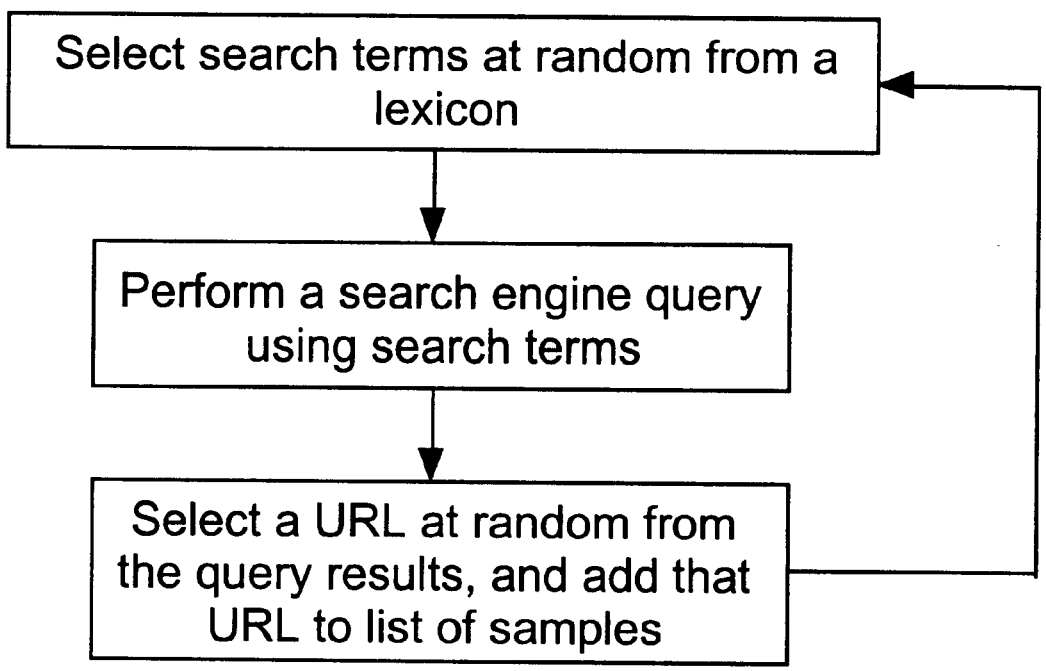
Figure 2:
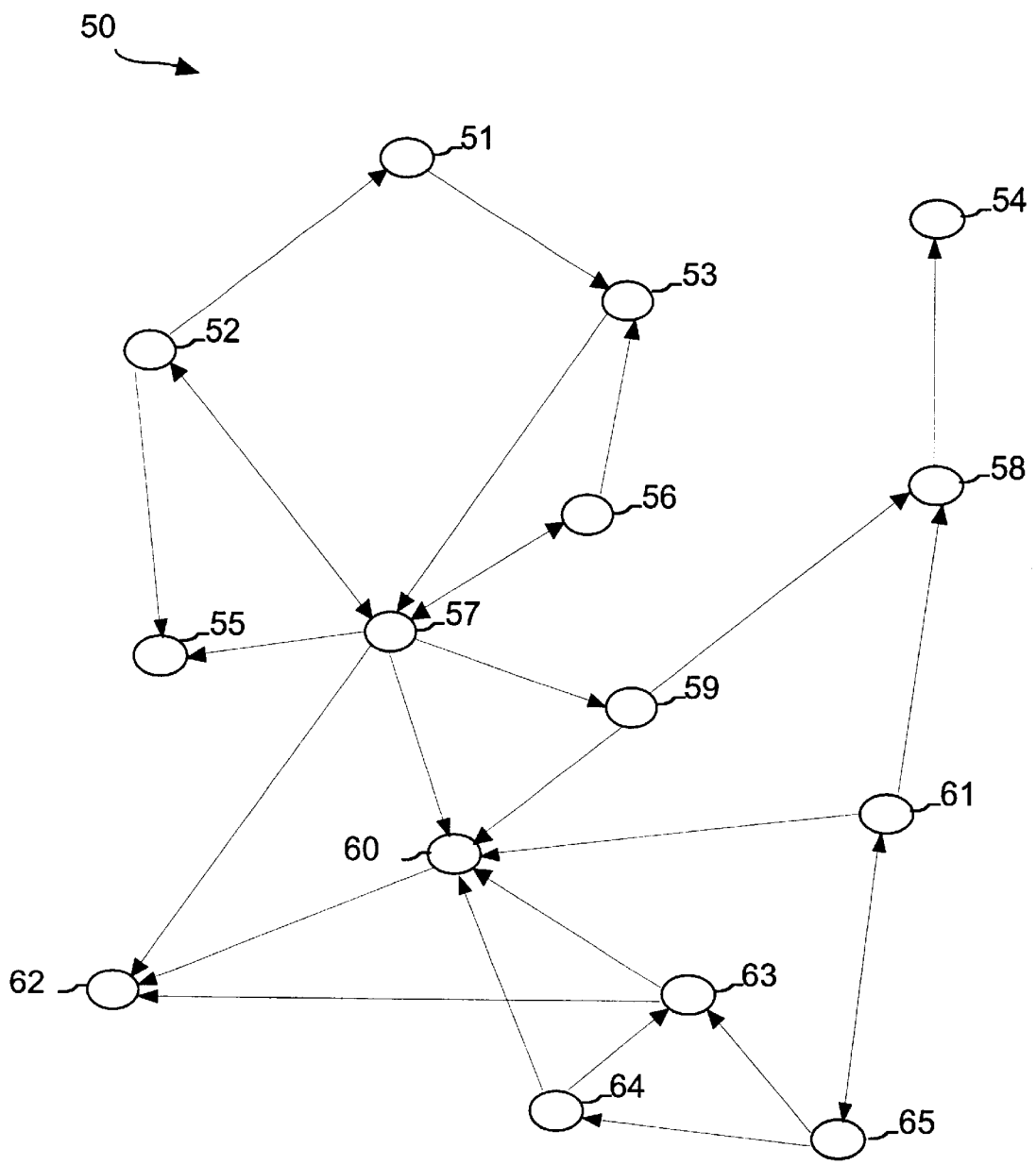
FIG. 2 depicts a set of linked data sets.
Figure 3:
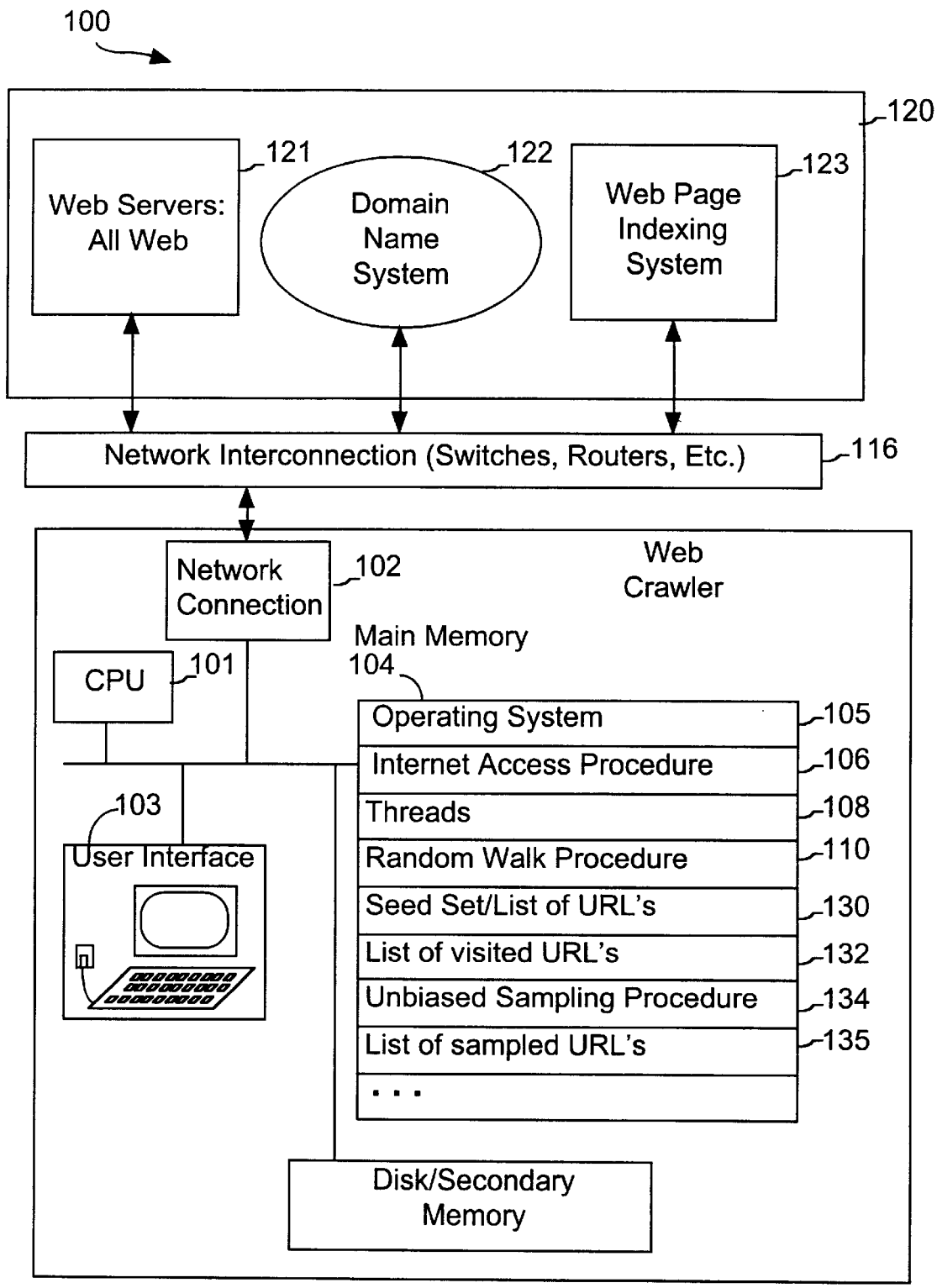
FIG. 3 is a block diagram of a distributed computer system, including a web crawler or other computer for implementing the present invention.

FIG. 3 shows an exemplary embodiment of a distributed computer system 100. The distributed computer system 100 includes a web crawler 115 connected to a network 120 through a network interconnection 116. The network 120 may be a global communication network, such as the Internet, or a private network, sometimes called an Intranet. Examples of network interconnection 116 includes switches, routers, etc.

The Internet network 120 includes web servers 121 and a service known as a domain name system 122. It may also optionally include a web page indexing system 123. The web servers 121 store web pages. The domain name system 122 is a distributed database that provides the mapping between Internet Protocol (IP) addresses and host names. The domain name system 122 is a distributed system because no single site on the Internet has the domain name mapping information for all the web servers in the network. Each site participating in the domain name system 122 maintains its own database of information and runs a server program that other systems across the Intranet or Internet can query. The domain name system provides the protocol that allows clients and servers to communicate with each other. Any application may look up the IP address (or addresses) corresponding to a given host name or the host name corresponding to a given IP address in the domain name system 122. An application accesses the domain name system 122 through a resolver. The resolver contacts one or more name servers to perform a mapping of a host name to the corresponding IP address, or vice versa. A given host name may be associated with more than one IP address because an Intranet or Internet host may have multiple interfaces, with each interface of the host having a unique IP address. The domain name system 122 may be accessed by the web crawler 115 in the process of downloading web pages from the world wide web.

Web Crawler System

The web crawler 115 includes a communications interface, or network connection, 102, one or more CPU's 101, an operator interface 103 (which may be remotely located on another computer), primary or main memory 104 and secondary (e.g. disk) memory 112. In an exemplary embodiment, the network connection 102 is able to handle overlapping communication requests. The memory 104 includes:

- a multitasking operating system 105;
- an Intranet/Internet access procedure 106 for fetching web pages as well as communicating with the domain name system 122;
- one or more threads 108 for downloading web pages from the servers 121, and processing the downloaded web pages;
- a main web crawler procedure, herein called the random walk module or procedure 110, executed by each of the threads 108;
- a set of URL's called the seed set 130;
- a list of visited URL's 132 that identifies the URL's of pages visited during a random walk; the list data structure preferably also stores the URL's of the outbound links in the visited pages (see FIG. 4);
- an unbiased sampling module or procedure 134 for sampling URL's from the list of visited URL's 132;
- a near-uniform list of URL's 135 generated by the unbiased sampling procedure 134.

Figures 4, 7:
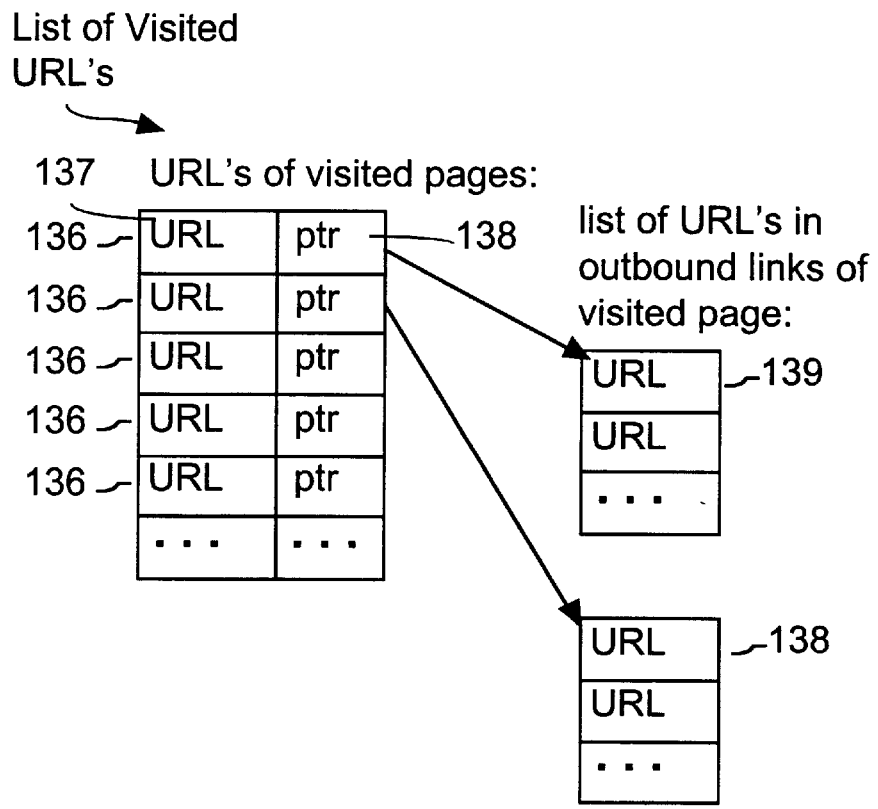
FIG. 4 is a block diagram of a data structure representing a list of visited data sets.
FIG. 7 is a flow chart of a first procedure for generating a reachability value for each address in a set of data set addresses, based on a visited ratio function.

Referring to FIG. 4, in a preferred embodiment the list of visited URL's 132 is stored in a data structure that includes a primary list of URL entries 136, each entry including a URL 137 and a pointer 138 to a list 139 of outbound link URL's. If a visited page contains no outbound links, the pointer 138 in the corresponding entry 136 is given a null value; otherwise it points to a list 139 of outbound link URL's stored by the random walk procedure. In embodiments in which the links between visited pages is not used by the unbiased sampling procedure 134, the pointers 138 and lists 139 need not be stored.

The URL's stored in the primary list of URL entries 136 are sampled by the unbiased sampling procedure 134. The URL's from the outbound links of visited pages are not sampled by the sampling procedure 134. Note that some of the unvisited URL's from outbound links may be invalid (there is no guarantee that the URL's in outbound links refer to existing data sets).

The set of addresses in the list of visited URL's 132 (i.e., the primary list of URL's actually visited by the random walk procedure) is sometimes herein called a set of randomly selected addresses, because the addresses in the list are generated by a random walk procedure.

Random Walk Module/Procedure

Figure 5:
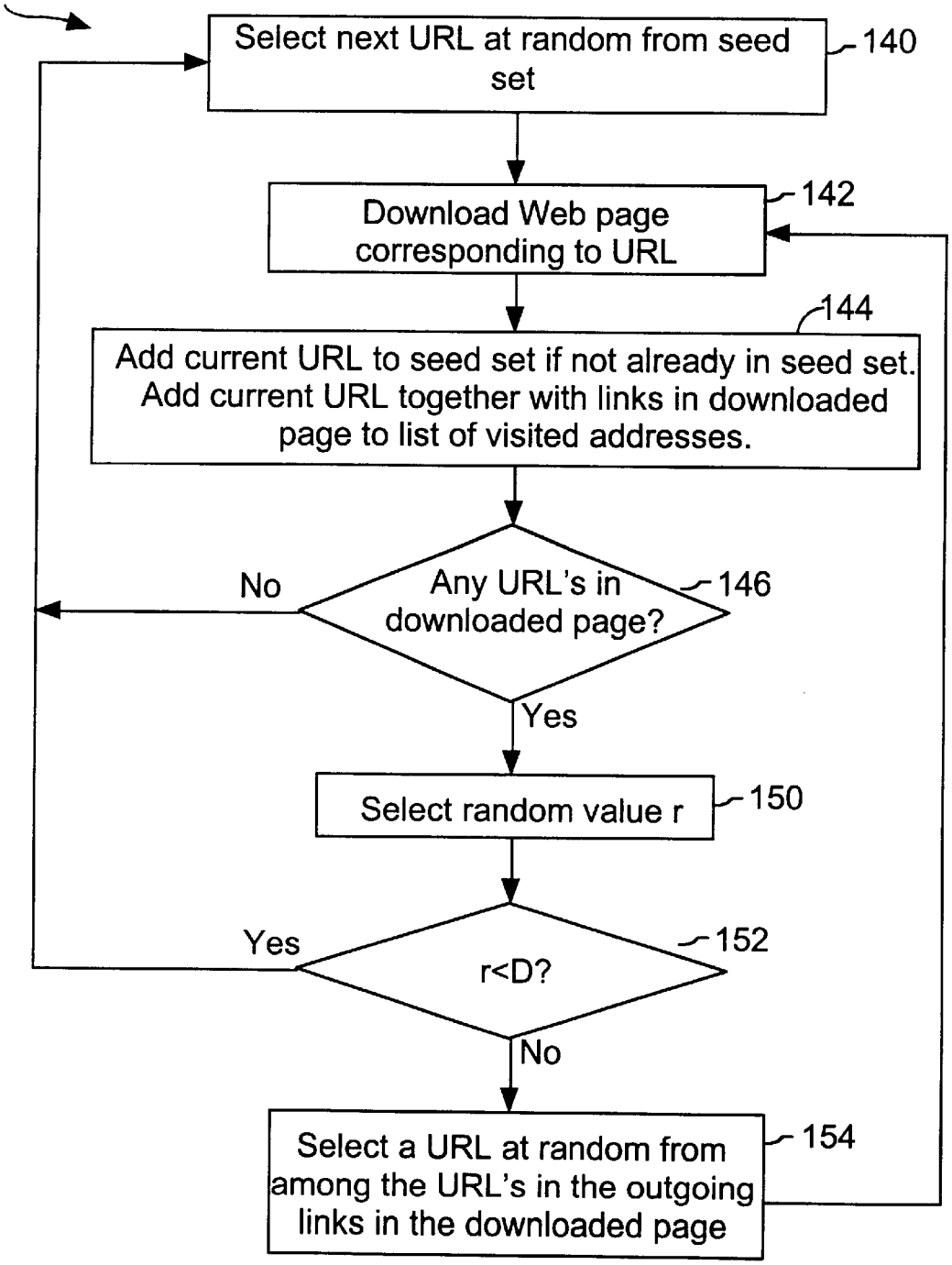
FIG. 5 is a flow chart of a random walk procedure performed by each thread of a system implementing an exemplary embodiment of the present invention.

Referring to FIG. 5, the random walk procedure begins by selecting a URL at random from a seed set of URL's (140). Random selection is performed, typically, by generating a random number r between 0 and 1, using any of a number of random or pseudo-random number generation techniques, which are well known to those of ordinary skill in the art. If the seed list has M entries, identified by indices 0 to M−1, the random number r is multiplied by M and the resulting value is then converted into an integer index, such as by rounding that value down to the closest integer. The URL corresponding to the integer index is the randomly selected URL. Except as otherwise described herein, all other random selection steps in the exemplary embodiments shall be assumed to be performed in a manner similar to that just described.

The seed set of URL's may be generated in any of a variety of ways. Typically, the pages in the seed set are well connected pages that are each within a small number of links to large numbers of other web pages.

The page at the selected URL (called the current URL) is downloaded (142). If the URL for the current page is not in the seed set, it is added to the seed set. Also, the current URL, along with the URL links in the downloaded page, are recorded in the list of visited addresses (144). The outbound (also called outgoing) URL links, if any, of the visited URL are preferably recorded (in an outbound link URL list 139, FIG. 4) by the random walk procedure so that this information does not need to be collected during computation of the page rank function, as described below. In embodiments where this outbound URL link information is not needed later, it is preferably not recorded in the list of visited URL's. If the downloaded page includes outbound links to other pages (146-Yes), a next URL is selected as follows. First, a random value r is generated (150). If r is less than a predefined value D (152), a next URL is selected at random from the seed set (140), and otherwise a next URL is selected at random from among the URL's in the outbound links of the current downloaded page. The predefined value D is preferably a value between 0.1 and 0.15. The comparison of random value r with predefined value D at step 152 is used to randomly limit the length of each walk (measured in terms of downloaded pages) that starts with a page in the seed set to a number whose average value is equal to the inverse of D. Thus, if D is equal to 0.14, then an average of approximately seven (i.e., 1/0.14) pages are downloaded by the random walk starting at each selected page in the seed set.

When a downloaded page contains no outbound links (146-No), a next URL is randomly selected from the seed set (140).

The random walk procedure is performed by each of the threads of the web crawler until a predefined termination condition is reached. Examples of suitable termination conditions include: the list of visited pages reaching a particular size (i.e., the number of visited pages reaching a predefined threshold), or a particular amount of time expiring.

In alternate exemplary embodiments, the random walk procedure could be implemented in any of a variety of different ways. For instance, the random walk procedure could select and download P pages, using P−1 successive links, for each page randomly selected from the seed set, with an appropriate provision for handling downloaded pages having no outbound links. For instance, pages with no outbound links can be handled as described above, or by randomly selecting another link from the previously downloaded page. Many other ways of conducting the random walk could also be used.

The number of pages visited during a random walk will vary from as low as a thousand to as high as several millions, or perhaps more as greater bandwidth and computing power become available. The list of visited pages, as a basis for generating a uniformly random set of URL's is not particularly useful unless the base set of visited URL's is large enough to fairly represent the pages in the relevant "space" of pages. Typically, when the set of pages for which the uniformly random set is to be generated is the world wide web, the random walk should visit at least 100,000 and preferably at least a million pages. For sets of pages in an Intranet, the number of visited pages in the random walk will be a function of the number of distinct pages in the Intranet and the diversity of pages therein.

Unbiased Sampling Module/Procedure

Once the random walk is completed, the sampling procedure is used to generate an unbiased sampling of URL's from the list of visited URL's. As indicated earlier, the list of visited URL's is heavily biased toward well connected pages that are referenced by many other pages. The purpose of the sampling procedure is to generate a list of samples of URL's that compensates for that bias, so as to generate a near-uniform set of URL's. It may be noted that this list of samples, sometimes herein called a "set of samples" or a "sampled set," may include more than one occurrence of some URL's.

Figure 6:
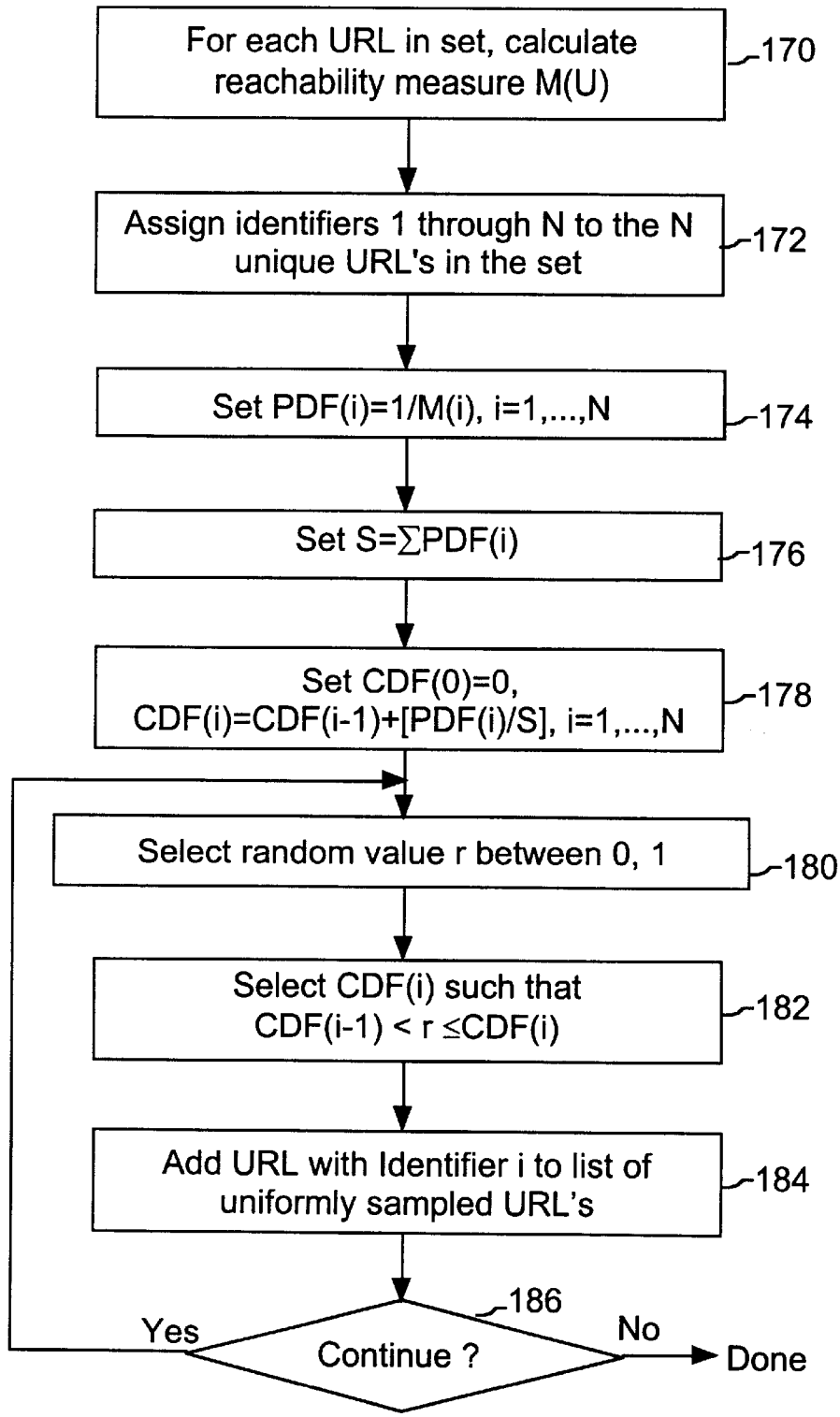
FIG. 6 is a flow chart of a sampling procedure performed by a system implementing an exemplary embodiment of the present invention.

Referring to FIG. 6, the unbiased sampling procedure begins by computing a reachability measure or value for each URL in the list of visited URL's (170). There are at least two ways to compute or generate a reachability value. Referring to FIG. 7, the simpler of the two is to set the reachability value to a "visited ratio" (VR), computed for each URL u as follows:

$$VR(u) = \frac{\text{number of times "u" was visited during the random walk}}{\text{total number page visits during the random walk}}$$

where u represents one of the URL's in the list of visited URL's. A page is "visited" during the random walk when it is downloaded (see step 142). "Visiting" a URL and visiting the page referenced by a URL are considered to mean the same thing.

Computation of the visited ratio requires that the random walk procedure keep track of (A) the number of times each URL in the list of visited URL's is visited during the random walk, and (B) the total number of page visits during the random walk.

Figure 8:
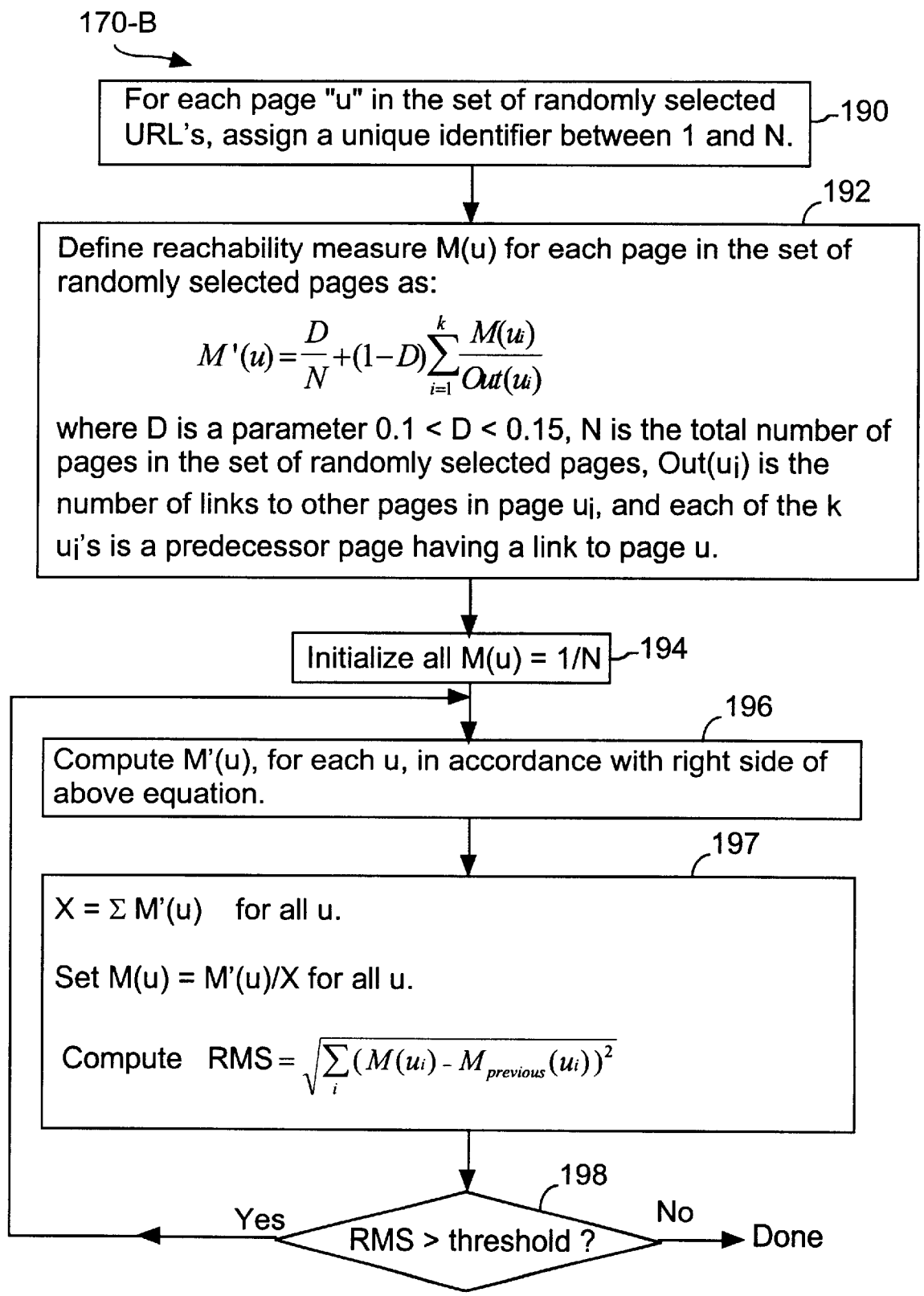
FIG. 8 is a flow chart of a second procedure for generating a reachability value for each address in a set of data set addresses, based on a page rank function.

The reachability value for a URL can alternately be set to a page rank value, determined by a page rank function whose operation is shown in FIG. 8. In this version, a unique identifier (1 to N) is assigned to each distinct URL in the set of visited URL's (190). The reachability measure M(u) for each page is initially set to a value of 1/N (194). Then, an updated reachability measure M'(u) is computed for each u (196), in accordance with the following page rank formula:

$$M'(u) = \frac{D}{N} + (1-D)\sum_{i=1}^{k} \frac{M(u_i)}{Out(u_i)}$$

where u is one of the URL's in the list of visited URL's, D is the aforementioned parameter preferably having a value between 0.1 and 0.15, N is the total number of distinct (unique) URL's in list of visited URL's, $Out(u_i)$ is the number of outbound links to other pages in the page at $u_i$, and each of the k pages at URL's $u_i$, for i=1 to k, is a predecessor page having a link to page u.

In order to be able to compute the M'(u) values, the procedure computing the page rank function will need to access the outbound link information stored in the list of visited pages by the random walk procedure. This outbound link information is used when computing the value of M'(u) for each distinct URL in the list of visited URL's in order to determine which pages have links to each page u for which a page rank is being computed. In other words, inbound link information for each page u is extracted from the outbound link information stored in the visited list.

The sum $$\sum_{i=1}^{k} \frac{M(u_i)}{Out(u_i)}$$

in the above equation represents the probability of the random walk linking from any predecessor page to page u, and the product of that sum with 1-D represents the probability that random walk would reach page u by linking from a predecessor page. The D/N factor in the above equation represents the probability of the random walk procedure selecting page u from the set of seed pages (FIG. 5, 140).

The M'(u) values computed in 196 are normalized by summing the M'(u) values for all the distinct URL's in the list of visited URL's so as to generate a value X, and then dividing the M'(u) values by X to compute an updated M(u) value for each URL u (197). In addition, a root mean square error value RMS is computed to determine the "distance" between the previous set of M(u) values (if any) and the current set of M(u) values in accordance with the standard root mean square formula:

$$RMS = \sqrt{\sum_i (M(u_i) - M_{previous}(u_i))^2}$$

The page rank function is repeated (steps 196, 197) until the error value RMS falls below a preselected threshold (198). The final set of normalized page rank values M(u) computed by the page rank function are used by the sampling procedure as the reachability values for the URL's in the list of visited URL's.

Once the reachability values for the URL's in the list of visited URL's have been generated (170), the sampling procedure (FIG. 6) continues. As indicated earlier, unique identifiers, such as 1 to N, are assigned to each of the distinct URL's in the list of visited URL's (172). A probability density function PDF(i) is computed (174) for each of the URL's, by computing the inverse of the reachability value M(u) for each of the URL's:

$$PDF(i) = \frac{1}{M(i)} \text{ for } i = 1 \text{ to } N$$

and the sum S of the probability densities is also computed (176). It is noted that "the normalized PDF(i) value" for each URL is equal to PDF(i)/S, and that the sum of the normalized PDF(i) values is equal to 1.

Then, a cumulative probability density function CDF is generated (178) as follows. CDF(0) is set to 0. CDF(1) is set to CDF(0) plus PDF(1)/S. Subsequently, the CDF for each URL i is set equal to the CDF of the previous URL i-1 plus the normalized PDF value of URL i, as follows:

$$CDF(i) = CDF(i-1) + \frac{PDF(i)}{S} \text{ for } i = 1 \text{ to } N.$$

Note that by this definition, CDF(N) is equal to 1. The resulting cumulative probability density function CDF allocates to each URL i an amount of "space" between CDF(i-1) and CDF(i) that is equal to the normalized probability density function for that URL. Furthermore, the amount of space allocated to each URL in CDF is the inverse of the reachability measure of that URL. At the conclusion of step 178 the sampling procedure has constructed a cumulative probability density function CDF that is ready for sampling.

Sampling of CDF, and thus of the URL's in the list of visited URL's is accomplished as follows. A random value r is generated, having a value between 0 and 1. Using the value of r, an index i is selected such that CDF(i-1)<r≦CDF(i) (182), and then the corresponding URL (i.e., the one assigned identifier i in step 172) is added to the list of uniformly sampled URL's (184). Steps 180 to 184 are repeated until a termination condition is reached (186), such as when the uniformly sampled list contains a predefined number of URL's. The resulting uniformly sampled list 135 (FIG. 3) can then be used for any of the tasks mentioned above in the Background section of this document.

Alternate Embodiments

The present invention can be implemented as a computer program product that includes a computer program mechanism embedded in a computer readable storage medium. For instance, the computer program product could contain the program modules shown in FIG. 3. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method of generating a list of near-uniform samples of data sets from among a plurality of host computers, comprising the steps of:

(a) generating a set of randomly selected addresses, wherein each address in the set of randomly selected addresses corresponds to a data set, and two or more addresses in the set are distinct addresses;

(b) for each distinct address in the set of randomly selected addresses, computing a reachability measure; and (c) selecting samples from the set of randomly selected addresses, such that the probability of selecting a given distinct address is inversely proportional to the reachability measure for the distinct address, the selected samples comprising the list of near-uniform samples.

2. The method of claim 1, wherein the generating step (a) comprises the following steps:

selecting a current address;

downloading a data set corresponding to the current address;

adding the current address to the set of randomly selected addresses; and when the current address is not in a seed set, adding the current address to the seed set.

3. The method of claim 2, wherein the selecting step comprises the following steps:

(a1) when selecting an initial current address, selecting as the current address an address uniformly at random from the seed set;

(a2) otherwise, selecting as the current address a new address, wherein the selection comprises:
  (a2-1) when there are no referred data sets in the data set corresponding to the current address, selecting a new address uniformly at random from the seed set; and
  (a2-2) when there is at least one referred data set in the data set corresponding to the current address, selecting a uniform real-valued random value r, and where r is less than a predetermined value, selecting an address uniformly at random from the seed set to be the new address, and where r is greater than or equal to the predetermined value, selecting uniformly at random an address of one of the referred data sets to be the new address.

4. The method of claim 3, wherein the computing step (b) comprises the following steps:
  for each respective distinct address in the set, setting the reachability measure equal to a visited ratio comprising a ratio of visits to the respective distinct address to a total number of a addresses visited during performance of step (a) the method.

5. The method of claim 1, wherein the computing step (b) comprises the following steps:
  for each respective distinct address in the set, setting the reachability measure equal to a visited ratio comprising a ratio of visits to the respective distinct address to visits to all addresses in the set during performance of step (a).

6. The method of claim 3, wherein the computing step (b) comprises the following steps:
  for each respective distinct address in the set, setting the reachability measure equal to a page rank comprising an estimate, computed using a predefined page rank function, of what fraction of visits in an infinitely long random walk of reachable data sets at the plurality of hosts would be to a data set at the respective distinct address.

7. The method of claim 1, wherein the computing step (b) comprises the following steps:
  for each respective distinct address in the set, setting the reachability measure equal to a page rank comprising an estimate, computed using a predefined page rank function, of what fraction of visits in an infinitely long random walk of reachable data sets at the plurality of hosts would be to a data set at the respective distinct address.

8. The method of claim 1, wherein the sampling step (c) comprises the following steps:
  (c1) for each distinct address in the set, computing a cumulative probability density function using the reachability measure; and
  (c2) for each sample desired in a list of near-uniform samples
    (c2-1) selecting a random value of the cumulative probability density function; and
    (c2-2) adding to the list a distinct address corresponding to the random value of the cumulative probability density function.

9. The method of claim 4, wherein the sampling step (c) comprises the following steps:
  (c1) for each distinct address in the set, computing a cumulative probability density function using the reachability measure; and
  (c2) for each sample desired in a list of near-uniform samples
    (c2-1) selecting a random value of the cumulative probability density function; and
    (c2-2) adding to the list a distinct address corresponding to the random value of the cumulative probability density function.

10. The method of claim 5, wherein the sampling step (c) comprises the following steps:
  (c1) for each distinct address in the set, computing a cumulative probability density function using the reachability measure; and
  (c2) for each sample desired in a list of near-uniform samples
    (c2-1) selecting a random value of the cumulative probability density function; and
    (c2-2) adding to the list a distinct address corresponding to the random value of the cumulative probability density function.

11. The method of claim 6, wherein the sampling step (c) comprises the following steps:
  (c1) for each distinct address in the set, computing a cumulative probability density function using the reachability measure; and
  (c2) for each sample desired in a list of near-uniform samples
    (c2-1) selecting a random value of the cumulative probability density function; and
    (c2-2) adding to the list a distinct address corresponding to the random value of the cumulative probability density function.

12. The method of claim 7, wherein the sampling step (c) comprises the following steps:
  (c1) for each distinct address in the set, computing a cumulative probability density function using the reachability measure; and
  (c2) for each sample desired in a list of near-uniform samples
    (c2-1) selecting a random value of the cumulative probability density function; and
    (c2-2) adding to the list a distinct address corresponding to the random value of the cumulative probability density function.

13. A computer program product for use in conjunction with a computer system, the computer program product comprising a computer readable storage medium and a computer program mechanism embedded therein, the computer program mechanism comprising:
  a random walk module for accessing data sets at addresses, the addresses including a seed set of addresses, and generating a set of randomly selected addresses comprising addresses of referred data sets in the accessed data sets; the set of randomly selected addresses including a plurality of distinct addresses; and
  a sampling module for computing a reachability measure for each distinct address in the set of randomly selected addresses, and selecting samples from the set of randomly selected addresses, such that the probability of selecting a given distinct address is inversely proportional to the reachability measure for the distinct address, the selected samples comprising a list of near-uniform samples.

14. The computer program product of claim 13, wherein the random walk module includes instructions for:
  (a) selecting a current address;

(b) downloading a data set corresponding to the current address;

(c) adding the current address to the set of randomly selected addresses; and (d) when the current address is not in a seed set, adding the current address to the seed set.

15. The computer program product of claim 14, wherein the random walk module further includes instructions, to e executed for each item desired in the set of randomly selected addresses, for:

(a1) when there is no existing current address, selecting as the current address an address uniformly at random from the seed set;

(a2) when there is an existing current address, selecting as the current address a new address, wherein the selection comprises:

(a2-1) when there are no more referred data sets in the data set corresponding to the current address, selecting a new address uniformly at random from the seed set; and (a2-2) when there are referred data s et s in the data set corresponding to the current address, selecting a uniform real-valued random value r, and where r is less than a predetermined value, selecting an address uniformly at random from the seed set to be the new address, and where r is greater than or equal to the predetermined value, selecting uniformly at random an address of one of the referred data sets to be the new address.

16. The computer program product of claim 15, wherein the sampling module includes instructions, to be executed for each respective distinct address in the set, for setting the reachability measure equal to a visit ed ratio comprising a ratio of visits to the respective distinct address to visits to all addresses in the set during performance of step (a).

17. The computer program product of claim 13, wherein the sampling module includes instructions, to be executed for each respective distinct address in the set, for setting the reachability measure equal to a visited ratio comprising a ratio of visits to the respective distinct address to visits to all addresses in the set during performance of step (a).

18. The computer program product of claim 15, wherein the sampling module includes instructions, to be executed for each respective distinct address in the set, for setting the reachability measure equal to a page rank comprising an estimate, computed using a predefined page rank function, of what fraction of visits in an infinitely long random walk of reachable data sets at the plurality of hosts would be to a data set at the respective distinct address.

19. The computer program product of claim 13, wherein the sampling module includes instructions, to be executed for each respective distinct address in the set, for setting the reachability measure equal to a page rank comprising an estimate, computed using a predefined page rank function, of what fraction of visits in an infinitely long random walk of reachable data sets at the plurality of hosts would be to a data set at the respective distinct address.

20. The computer program product of claim 13, wherein the sampling module includes instructions:

(c1) to be executed for each distinct address in the set, for computing a cumulative probability density function using the reachability measure; and (c2) to be executed for each sample desired in a list of near-uniform samples, for:

(c2-1) selecting a random value of the cumulative probability density function; and (c2-2) adding to the list a distinct address corresponding to the random value of the cumulative probability density function.

21. The computer program product of claim 16, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

22. The computer program product of claim 17, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

23. The computer program product of claim 18, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

24. The computer program product of claim 19, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

25. A web crawler for downloading data sets from among a plurality of host computers, comprising:

one or more central processing units;

a communications interface for communicating with the host computers;

memory for storing addresses of data sets and downloaded data sets;

a random walk module, executed by the one or more central processing units, for accessing data sets at addresses, the addresses including a seed set of addresses, and generating a set of randomly selected addresses comprising addresses of referred data sets in the accessed data sets; the set of randomly selected addresses including a plurality of distinct addresses; and a sampling module, executed by the one or more central processing units, for computing a reachability measure for each distinct address in the set of randomly selected addresses, and selecting samples from the set of randomly selected addresses, such that the probability of selecting a given distinct address is inversely proportional to the reachability measure for the distinct address, the selected samples comprising a list of near-uniform samples.

26. The web crawler of claim 25, wherein the random walk module includes instructions for:

(a) selecting a current address;

(b) downloading a data set corresponding to the current address;

(c) adding the current address to the set of randomly selected addresses; and (d) when the current address is not in a seed set, adding the current address to the seed set.

27. The web crawler of claim 26, wherein the random walk module further includes instructions, to e executed for each item desired in the set of randomly selected addresses, for:

(a1) when there is no existing current address, selecting as the current address an address uniformly at random from the seed set;

(a2) when there is an existing current address, selecting as the current address a new address, wherein the selection comprises:

(a2-1) when there are no more referred data sets in the data set corresponding to the current address, selecting a new address uniformly at random from the seed set; and (a2-2) when there are referred data sets in the data set corresponding to the current address, selecting a uniform real-valued random value r, and where r is less than a predetermined value, selecting an address uniformly at random from the seed set to be the new address, and where r is greater than or equal to the predetermined value, selecting uniformly at random an address of one of the referred data sets to be the new address.

28. The web crawler of claim 27, wherein the sampling module includes instructions, to be executed for each respective distinct address in the set, for setting the reachability measure equal to a visited ratio comprising a ratio of visits to the respective distinct address to visits to all addresses in the set during performance of step (a).

29. The web crawler of claim 25, wherein the sampling module includes instructions, to be executed for each respective distinct address in the set, for setting the reachability measure equal to a visited; ratio comprising a ratio of visits to the respective distinct address to visits to all addresses in the set during performance of step (a).

30. The web crawler of claim 27, wherein the sampling module includes instructions, to be executed for each respective distinct address in the set, for setting the reachability measure equal to a page rank comprising an estimate, computed using a predefined page rank function, of what fraction of visits in an infinitely long random walk of reachable data sets at the plurality of hosts would be to a data set at the respective distinct address.

31. The web crawler of claim 25, wherein the sampling module includes instructions, to be executed for each respective distinct address in the set, for setting the reachability measure equal to a page rank comprising an estimate, computed using a predefined page rank function, of what fraction of visits in an infinitely long random walk of reachable data sets at the plurality of hosts would be to a data set at the respective distinct address.

32. The web crawler of claim 25, wherein the sampling module includes instructions:

(c1) to be executed for each distinct address in the set, for computing a cumulative probability density function using the reachability measure; and (c2) to be executed for each sample desired in a list of near-uniform samples, for:

(c2-1) selecting a random value of the cumulative probability density function; and (c2-2) adding to the list a distinct address corresponding to the random value of the cumulative probability density function.

33. The web crawler of claim 28, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

34. The web crawler of claim 29, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

35. The web crawler of claim 30, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

36. The web crawler of claim 31, wherein the sampling module includes instructions:

(c1) to be executed for each distinct address in the set, computing a cumulative probability density function using the reachability measure; and (c2) to be executed for each sample desired in a list of near-uniform samples (c2-1) selecting a random value of the cumulative probability density function; and (c2-2) adding to the list a distinct address corresponding to the random value of the cumulative probability density function.

* * * * *

UNITED STATES PATENT AND TRADEMARK OFFICE
CERTIFICATE OF CORRECTION

PATENT NO. : 6,594,694 B1
DATED : July 15, 2003
INVENTOR(S) : Marc Alexander Najork et al.

It is certified that error appears in the above-identified patent and that said Letters Patent is hereby corrected as shown below:

Column 11,
Line 8, after "to" delete "e" and insert therefor -- be --
Line 21, delete "s et s" and insert therefor -- sets --
Line 34, delete "visit ed" and insert therefor -- visited --

Column 13,
Line 21, after "to" delete "e" and insert therefor -- be --
Line 52, after "visited" delete ";"

Column 14,
Line 6, after "set," delete "for"

Signed and Sealed this

Third Day of May, 2005

JON W. DUDAS
*Director of the United States Patent and Trademark Office*